United States Patent [19]

Clas et al.

[11] 4,107,123

[45] Aug. 15, 1978

[54] POLYVINYL CHLORIDE/SILICIC ACID/HEXANETRIOL MIXTURES AND PROCESS FOR THEIR PREPARATION

[75] Inventors: Willi Clas, Wesseling; Wolfgang Büchel, Bornheim-Widdig, both of Germany

[73] Assignee: Duetsohe Gold- und Silber-Scheideanstalt vormals Röessler, Frankfurt am Main, Fed. Rep. of Germany

[21] Appl. No.: 794,679

[22] Filed: May 6, 1977

Related U.S. Application Data

[63] Continuation-in-part of Ser. No. 608,794, Aug. 28, 1975, abandoned, which is a continuation of Ser. No. 451,313, Mar. 14, 1974, abandoned, which is a continuation of Ser. No. 226,529, Feb. 15, 1972, abandoned.

[30] Foreign Application Priority Data

Feb. 16, 1971 [DE] Fed. Rep. of Germany ....... 2107243

[51] Int. Cl.$^2$ .......................... C08J 3/20; C08K 5/05; C08K 5/12; C08L 27/06

[52] U.S. Cl. .................. 260/31.8 G; 260/31.8 R; 260/33.4 R; 260/42.49; 260/42.57; 260/45.95 L

[58] Field of Search ............ 260/42.49, 42.57, 33.4 R, 260/31.8 G, 45.95 L

[56] References Cited

U.S. PATENT DOCUMENTS

2,427,071  9/1947  Reuter .............................. 260/42.49

OTHER PUBLICATIONS

Schue, "Fumed Silica in Plastics", *SPE. Jour.*, Jul. 1969, vol. 25, pp. 40–43.
"The Condensed Chemical Dict.", 5th Edition, p. 980.

*Primary Examiner*—Allan Lieberman
*Attorney, Agent, or Firm*—Beveridge, DeGrandi, Kline & Lunsford

[57] ABSTRACT

A process for improving the physical and chemical properties of mixtures of polyvinyl chloride and finely divided synthetic silicic acid, which comprises mixing hexanetriol with the polyvinyl chloride and silicic acid. A composition and article of manufacture are provided. Finished products exhibit increased hardness, heat stability and resistance to discoloration, and are useful as shoe soles and floor coverings.

7 Claims, No Drawings

POLYVINYL CHLORIDE/SILICIC ACID/HEXANETRIOL MIXTURES AND PROCESS FOR THEIR PREPARATION

CROSS REFERENCES TO RELATED APPLICATIONS

This application is a continuation-in-part of copending application Ser. No. 608,794, filed Aug. 28, 1975, now abandoned which is a continuation of application Ser. No. 451,313, filed Mar. 14, 1974, now abandoned, which in turn is a continuation of application Ser. No. 226,529, filed Feb. 15, 1972, now abandoned.

BACKGROUND OF THE INVENTION

This invention relates to a process for the improvement of the physical and chemical properties of mixtures of polyvinyl chloride and finely divided synthetic silicic acid. More particularly, it relates to the use of hexanetriol with such mixtures to obtain finished products having increased hardness, heat stability and resistance to discoloration.

PVC is one of the most widely employed plastic materials. The thermal plasticity of this material frequently limits its application, especially when used for shoe soles, profiles, and hoses made of hard or soft PVC, as well as floor coverings. The thermal plasticity at low temperatures can be improved by the use of plasticizers (e.g., phthalates, sebacates, etc.); however, use of plasticizers reduces the heat stability of the plastic, causing stickness, a greasy grip or a greasy surface sheen. It is known in the art that these latter characteristics can be overcome by the addition of small amounts (e.g., 1 to 3%) of a pyrogenic or precipitated silicic acid. The addition of larger amounts of the silicic acid would be desirable. This is especially true with the relatively low cost precipitated silicic acids. However, larger additions generally result in an undesirable darkening of the finished product, probably as a result of increased HCl liberation. Consequently, the large quantities of silicic acid required to obtain improved heat stability cannot generally be employed.

Although the use of natural fillers, particularly chalks and kaolins, is known in the art, these fillers do not bring about any improvement in the physical and chemical properties of PVC mixtures. Rather, they merely serve to reduce the cost of finished products having less stringent application requirements.

Consequently, there exists a need for a process for improving the physical and chemical properties of mixtures of polyvinyl chloride (PVC) with finely divided synthetic silicic acids, whereby finished products are obtained which exhibit markedly greater hardness and heat stability, and which at the same time are free from discoloration. The finished products should be particularly suited for soles of shoes and floor coverings.

SUMMARY OF THE INVENTION

Accordingly, this invention provides a process for improving the physical and chemical properties of mixtures of polyvinyl chloride and finely divided synthetic silicic acid. The process comprises mixing hexanetriol with the polyvinyl chloride and silicic acid.

This invention also provides a composition having improved chemical and physical properties. The composition consists essentially of a mixture of polyvinyl chloride and finely divided synthetic silicic acid. The mixture has hexanetriol uniformly dispersed therein.

According to this invention, there is also provided an article of manufacture comprising about 20–100 parts by weight of polyvinyl chloride, and up to about 20 parts by weight of hexanetriol.

As used herein, the term "consisting essentially of" means that specified components must be present, but unspecified components which do not materially detract from the basic and novel characteristics of the composition disclosed need not be excluded.

DETAILED DESCRIPTION

It has surprisingly been found that the addition of hexanetriol to PVC/silicic acid mixtures aids in overcoming the problems of the prior art. For example, about 20–100 parts by weight of finely divided silicic acid can be blended with about 100 parts by weight of PVC if hexanetriol is also used. The resulting product exhibits substantially improved hardness, heat stability and resistance to discoloration.

Hexanetriol having the formula $CH_3$—$CHOH$—$CH(CH_2OH)$—$CHOH$—$CH_3$ can be employed. This alcohol occurs as a by-product in the manufacture of buna. In a preferred embodiment of this invention, a premix is prepared. The premix comprises about a 1 : 1 weight ratio of the silicic acid and hexanetriol. The premix is then blended with the polyvinyl chloride and any other silicic acid and hexanetriol to be added.

While the finely divided silicic acids bring about the improvement of the physical properties of PVC-products, the relatively smaller quantities of hexanetriol serve as discoloration inhibitors. Consequently, the use of hexanetriol permits the addition of larger amounts of the silicic acid.

Under the term "synthetic silicic acid" come all products which are produced by the pyrolysis or hydrolysis of suitable compounds, such as $SiCl_4$ or $K_4SiF_6$ at ambient temperature or according to the well-known wet process. As used herein, the term "precipitated silicic acid" means a silicic acid prepared by any of the well-known methods of precipitation. Also, the term "pyrogenic silicic acid" means a silicic acid prepared by any of the well-known pyrogenic processes.

The pyrogenic silicic acids can be prepared by well-known processes. For example, they can be prepared by the high-temperature hydrolysis process, the flame hydrolysis process from silicon-halides (aerosil), or according to the arc process.

According to the wet process, the precipitated silicic acid can be prepared by precipitating the silicic acids from alkali-silicate solutions using an appropriate acid. A filter cake is obtained which is dried and ground, and the product is subjected to spray drying. Drying of the precipitate can also be accomplished by dehydration under hypercritical conditions, possibly in a mixture with solvents such as alcohols or ketones, or by means of azeotropic distillation (aerogel). Furthermore, the silicic acids used in this invention can be obtained by hydrothermal decomposition of natural, silicic acid-containing substances.

The preferred properties of the pyrogenic and precipitated silicic acids used in this invention are shown in the following table.

|  |  | "AEROSIL" | "Precipitated Silicic Acids" |
|---|---|---|---|
| Average size of primary particles | millimicron | 5–50 | 10–100 |
| Size of Secondary particles | micron | dimenstions not exactly measurable | 1–50 |
| Specific surface (BET) | m²/g | 50–500 | 100–800 |
| Difference between BET-surface and EM-surface | m²/g | slight | great in standard case |
| pH-value |  | 5 | 5 |
| Annealing loss after drying | weight % | 3 | 3 |
| Silanol group density | A²/SiOH | 25 | at 20 |
| SiO₂-content after drying | A²/SiOH % | 99 | 99 |
| Thickening-behavior | DIN-seconds | 45 | 45 |
| Shape of particles (EM-picture) |  | spherical | mostly non-spherical |

In a preferred embodiment of this invention, about 20–100 parts by weight of silicic acid are mixed with about 100 parts by weight polyvinyl chloride. It is further preferred that up to about 20 parts by weight of hexanetriol be used for each 100 parts by weight of silicic acid. It is further preferred that a precipitated silicic acid or a pyrogenic silicic acid be used. In either case, it is preferred that the silicic acid have an average particle size of about 10–100 millimicrons (m$\mu$) and a BET specific surface of about 30–400 m²/g.

This invention can be practiced using mixing equipment conventionally employed in the plastics industry. The mixing time will of course depend upon the quantities of materials, mixing characteristics of the equipment, etc. In any case, mixing should preferably be conducted until a practically uniform mixture is obtained. Mixing is generally conducted at ambient temperature, although some temperature rise might be observed during mixing due to the energy imparted to the materials being mixed. The sequence of addition of materials to the mixer is generally not critical, although it is preferred to use a premix of the silicic acid and hexanetriol as previously described. Once the mixture has been prepared, finished products can be prepared by methods well known in the plastics art. For example, the conventional molding, casting and extrusion processes can be employed.

This invention will be more clearly understood by reference to the following examples of PVC hard and soft mixtures. All parts, proportions and percentages are by weight unless otherwise indicated.

EXAMPLE 1 (Hardness Test)
a) Formula PVC hard (40 DOP):

| Designation | h*0 | h 40 | h 100 | Kh **40 | Kh 100 |  |
|---|---|---|---|---|---|---|
| Vinnol ®[3] |  |  |  |  |  | Parts by Weight |
| K 70 PVC | 100 |  |  |  |  |  |
| DOP (Dioctyl phthalate) | 40 |  |  |  |  |  |
| Advastab ®[1] | 5 |  |  |  |  |  |
| epox.soy oil | 5 |  |  |  |  |  |
| Lubricant (metal stearates, oils) | 1 |  |  |  |  |  |
| hexanetriol + SiO₂ | 10 |  |  |  |  |  |
| precipitated silicic acid[2] | 0 | 40 | 100 | — | — |  |
| ground chalk | — | — | — | 40 | 100 |  | b) Formula PVC soft (80 DOP): [4]

| Designation | w⁺0 | w 40 | w 100 | Kw ⁺⁺40 | Kw 100 |  |
|---|---|---|---|---|---|---|
| Vinnol ® |  |  |  |  |  | Parts by Weight |
| K 70 PVC | 100 |  |  |  |  |  |
| DOP (Dioctyl phthalate) | 80 |  |  |  |  |  |
| Advastab ®[1] | 5 |  |  |  |  |  |
| epox. soy oil | 5 |  |  |  |  |  |
| Lubricant (metal stearates, oils) | 1 |  |  |  |  |  |
| hexanetriol + SiO₂ | 10 |  |  |  |  |  |
| Precipitated silicic acid[2] | 0 | 40 | 100 | — | — |  |
| ground chalk | — | — | — | 40 | 100 |  |

[1] Mixture of 1.5 parts di - n - octyl tin mercaptide and 0.5 parts epoxidized soy oil
[2] Distinctive data: BET surface 240 m²/g, size of primary particles 16 m$\mu$, loss on drying (105° C) about 6%.

The mixtures were gelatinized on an open roller at 170° C. Check Shore hardness by German standard DIN 53505 (A and D after 30 seconds)

| a) Hard PVC | h 0 | h 40 | h 100 | Kh 40 | Kh 100 |
|---|---|---|---|---|---|
| A | 80 | 92 | 98 | 83 | 87 |
| D | 33 | 53 | 70 | 40 | 40 |
| b) Soft PVC | w 0 | w 40 | w 100 | Kw 40 | Kw 100 |
| A | 55 | 73 | 87 | 57 | 65 |
| D | 14 | 30 | 45 | 18 | 18 |

$\vphantom{}$ 8 = h (hard mixture)
** = Kh (Chalk-hard mixture)
⁺ = w (soft mixture)
⁺⁺ = Kw (chalk-soft mixture)
3) Vinnol® is a polyvinyl-chloride of the Wacker Co.
Advastab ® is a barium-cadmium stabilizer of the firm Advance.
[4] DOP = dioctylphthalate

EXAMPLE 2 (heat stability test)

100 parts by weight of PVC, 60 parts by weight of precipitated silicic acid or ground chalk, are mixed with 40 parts by weight DOP for PVC hard, or 80 parts by weight DOP for PVC soft, other components as in Example 1.

The heat stability or elongation at increased temperature under load is measured on 5 mm diameter extruded strings which are prepared on a Brabender extruder at 170° C nozzle temperature. An extruded string of constant length is drawn through the eye of a 1 kg weight, and both are brought to the desired temperature, the weight is lifted with the string and the elongation of the string is measured simultaneously in mm. The elongation is converted to cm/m, consequently expressing the elongation in %.

In this test, the following values were obtained:

| Elongation in %: | Without filler | 60 parts by weight ground chalk | 60 parts by weight precipitated silicic acid |
| --- | --- | --- | --- |
| PVC hard | 5.8 | 6.0 | 1.7 |
| PVC soft | 22.2 | 12 | 3.8 |

The elongation of the material filled with precipitated silicic acid was therefore considerably less, i.e., the heat stability was considerably improved compared to the unfilled PVC, or PVC filled with an inactive natural product (chalk).

Resistance to cold-brittleness is decreases somewhat, but is still within a usable value of −20° C in the case of hard PVC, and −40° C in the case of soft PVC.

When using finely divided pyrogenic silicic acids in the same ratio as the precipitated silicic acids, one will achieve even somewhat higher values of Shore-hardness and heat stability.

According to this invention, finished products are obtained which are free from discoloration, exhibit markedly greater hardness and heat resistance, and are particularly suited for shoe soles and floor coverings. Additional advantages of the novel process of this invention are to be found in the potential production of transparent films which are free from white fracture and are mar-proof to a reasonable degree. The fluidity of the powdery composition of this invention, and the surface luster of finished products made from the composition are favorably influenced. Adhesiveness, stickness and emergence of plasticizer during processing are prevented. Furthermore, injection molded articles having smoother surfaces can be prepared.

In the foregoing Examples, the hardness of the PVC (polyvinyl chloride) mixtures depends on the plasticizer content. For example, a "hard mixture" signifies a mixture containing 40 parts by weight DOP to 100 parts by weight PVC. A "soft mixture" designates a mixture containing 80 parts DOP to 100 parts PVC. A "chalk-hard mixture" and "chalk-soft mixture" are a "hard mixture" and a "soft mixture", respectively, containing either ground lime or chalk as a filler.

What is claimed is:

1. A process for improving the mechanical properties, heat stability and resistance to discoloration of mixtures of polyvinyl chloride and finely divided synthetic silicic acid, which comprises preparing a mixture consisting essentially of:
   (A) a plasticized polyvinyl chloride;
   (B) about 20 to about 100 parts by weight of a precipitated silicic acid per about 100 parts by weight of the polyvinyl chloride; and
   (C) hexanetriol in an amount up to about 20 parts by weight for each 100 parts by weight of the silicic acid; wherein the precipitated silicic acid has an average particle size of about 10–100 m$\mu$ and a BET specific surface of about 30 to about 800 m$^2$/g and the hexanetriol is present in an amount sufficient to substantially prevent discoloration of said mixture.

2. Process of claim 1 which comprises preparing a premix consisting of about 1 : 1 weight ratio of the silicic acid and hexanetriol, and then mixing said premix with the polyvinyl chloride.

3. Process according to claim 1 in which said plasticizer is dioctyl phthalate.

4. A composition having improved mechanical properties, heat stability and resistance to discoloration, said composition consisting essentially of a mixture of:
   (A) a plasticized polyvinyl chloride;
   (B) about 20 to about 100 parts by weight of a finely divided precipitated silicic acid per about 100 parts by weight of the polyvinyl chloride; and
   (C) hexanetriol in an amount up to about 20 parts by weight for each 100 parts by weight of the silicic acid; wherein the precipitated silicic acid has an average particle size of about 10–100 m$\mu$ and a BET specific surface of about 30 to about 800 m$^2$/g and the hexanetriol is present in an amount sufficient to substantially prevent discoloration of said composition.

5. Composition according to claim 4 wherein said plasticizer is dioctyl phthalate.

6. An article of manufacture consisting essentially of:
   (A) about 20 to about 100 parts by weight of finely divided precipitated silicic acid;
   (B) about 100 parts by weight of a plastized polyvinyl chloride; and
   (C) hexanetriol in an amount up to about 20 parts by weight per 100 parts by weight silicic acid; wherein the precipitated silicic acid has an average particle size of about 10–100 m$\mu$ and a BET specific surface of about 30 to about 800 m$^2$/g and the hexanetriol is present in an amount sufficient to substantially prevent discoloration of said composition.

7. An article of manufacture according to claim 6 wherein said plastizer is dioctyl phthalate.

* * * * *